(12) United States Patent
Abe (10) Patent No.: US 8,009,868 B2
(45) Date of Patent: Aug. 30, 2011

(54) METHOD OF PROCESSING IMAGES PHOTOGRAPHED BY PLURAL CAMERAS AND APPARATUS FOR THE SAME

(75) Inventor: Koichi Abe, Iwaki (JP)

(73) Assignee: Alpine Electronics, Inc., Shinagawa-Ku, Tokyo (JP)

( * ) Notice: Subject to any disclaimer, the term of this patent is extended or adjusted under 35 U.S.C. 154(b) by 996 days.

(21) Appl. No.: 11/679,550

(22) Filed: Feb. 27, 2007

(65) Prior Publication Data

US 2007/0206835 A1 Sep. 6, 2007

(30) Foreign Application Priority Data

Mar. 2, 2006 (JP) .................................. 2006-057033

(51) Int. Cl.
*G06K 9/00* (2006.01)
(52) U.S. Cl. ......... 382/104; 348/148; 340/461; 382/154
(58) Field of Classification Search .................. 382/104, 382/154; 348/239, 142–170; 359/857; 340/461, 340/436
See application file for complete search history.

(56) References Cited

U.S. PATENT DOCUMENTS

| 6,593,960 | B1* | 7/2003 | Sugimoto et al. | 348/148 |
|---|---|---|---|---|
| 6,911,997 | B1* | 6/2005 | Okamoto et al. | 348/148 |
| 7,076,345 | B2* | 7/2006 | Tanaka et al. | 701/28 |
| 7,145,519 | B2 | 12/2006 | Takahashi et al. | |
| 7,161,616 | B1* | 1/2007 | Okamoto et al. | 348/148 |
| 7,502,048 | B2* | 3/2009 | Okamoto et al. | 348/148 |

(Continued)

FOREIGN PATENT DOCUMENTS

JP 2003-204547 7/2003
(Continued)

OTHER PUBLICATIONS

Notification of Reasons for Refusal mailed Dec. 27, 2010, received in related Japanese Patent Application No. JP 2006-057033 (original and translated documents included).

*Primary Examiner* — Wesley Tucker
(74) *Attorney, Agent, or Firm* — Brinks Hofer Gilson & Lione (57) ABSTRACT

The invention provides a display method of processing images photographed by plural cameras and an apparatus for the same, which synthesizes the images by plural cameras mounted on a vehicle for photographing the surroundings thereof and makes it possible to display an easily viewable three-dimensional object near the vehicle, as if one camera were positioned above the vehicle. An image capture unit captures images photographed by plural cameras that photograph the surroundings of a vehicle. An upper observation point image processing unit synthesizes the captured images into an image viewed as from above the vehicle. An image intensity/chrominance determination unit detects an area wherein the displayed image varies from other areas in the synthesized image based on the intensity/chrominance thereof. When the intensity or the chrominance of the area is continuously varying, a three-dimensional object detection unit determines the detected area as a three-dimensional object. A three-dimensional object display processing is performed regarding the detected three-dimensional object image, using either an ordinary image display or a two-observation point image display. This three-dimensional object display image is associated with an upper observation point image at a base front end of the three-dimensional object by an image connecting synthesizing unit, and the associated image is displayed.

18 Claims, 5 Drawing Sheets

U.S. PATENT DOCUMENTS

| | | | |
|---|---|---|---|
| 7,576,767 B2 * | 8/2009 | Lee et al. | 348/36 |
| 2003/0222983 A1 * | 12/2003 | Nobori et al. | 348/148 |
| 2004/0184638 A1 * | 9/2004 | Nobori et al. | 382/104 |
| 2004/0201754 A1 * | 10/2004 | McAlister | 348/239 |
| 2005/0264527 A1 * | 12/2005 | Lin | 345/156 |
| 2007/0296874 A1 * | 12/2007 | Yoshimoto et al. | 348/739 |

FOREIGN PATENT DOCUMENTS

| | | |
|---|---|---|
| JP | 2004-56219 | 2/2004 |
| JP | 2003-309844 | 10/2004 |

* cited by examiner

(PRIOR ART)

FIG. 4(b)

(PRIOR ART)

FIG. 4(c)

(PRIOR ART)

FIG. 5(a)

(PRIOR ART)

FIG. 5(b)

(PRIOR ART)

METHOD OF PROCESSING IMAGES PHOTOGRAPHED BY PLURAL CAMERAS AND APPARATUS FOR THE SAME

RELATED APPLICATIONS

The present application claims priority to Japanese Patent Application Number 2006-057033, filed Mar. 2, 2006, the entirety of which is hereby incorporated by reference.

BACKGROUND OF THE INVENTION

1. Field of the Invention

The present invention relates to a method of processing images photographed by plural cameras and an apparatus for the same, which photographs the surroundings of a vehicle by plural cameras mounted on the vehicle and synthesizes the photographed images to thereby display an image as if one camera positioned above the vehicle photographed the surroundings of the vehicle.

2. Description of the Related Art

When driving a vehicle into a narrow garage or a narrow parking lot, a driver needs to pay close attention, yet the driver still may bring about an accident such as rubbing the vehicle with a surrounding object. When driving the vehicle out of the garage or the parking lot, the driver also needs to pay full attention to surrounding objects and people. Further, there are many other cases that demand the close attention of the driver, for example, when driving the vehicle on a very narrow road or passing an oncoming vehicle in an opposite lane, the driver needs to pay full attention so that the vehicle does not scrape a surrounding object and does not catch a wheel in a gutter.

As a countermeasure, a system broadly applied to vehicles in recent years uses cameras for photographing the surroundings of a vehicle, such as a rear camera that photographs behind the vehicle to display the photographed image on a monitor, so as to facilitate driving the vehicle into a garage or a parking lot, and side cameras that photograph from both sides of the vehicle, so as to confirm vehicles, etc. traveling on the road ahead when the user's vehicle proceeds into an obstructed narrow road. The system monitors the situation surrounding the vehicle, and allows the driver to drive the vehicle while fully comprehending the situation.

However, even though super wide-angle cameras are used as the cameras for photographing the surroundings of the vehicle, when backing the vehicle into a garage in a situation that an obstacle exists near the back of the vehicle, for example, the obstacle leaves the sight of the rear camera as the vehicle backs up, and it becomes impossible to comprehend the state of the obstacle. As a countermeasure for this case, it is conceivable to provide the super wide-angle cameras on both sides of the vehicle, and to make it possible to view an area that is out of sight of the rear camera by means of the side cameras.

However, an image of an object photographed by the above super wide-angle camera provides a large difference between the center and periphery of a photographed image. Viewing only the photographed image will not show a clear positional relation between the object and the vehicle, and the vehicle may encounter an unexpected collision or rubbing. Even if the image by the rear camera is switched to the image by the side cameras, the image of the object such as an obstacle displayed on the screen looks very different from the real object, and it is not easy to comprehend the state of the real object.

Figure 4A:
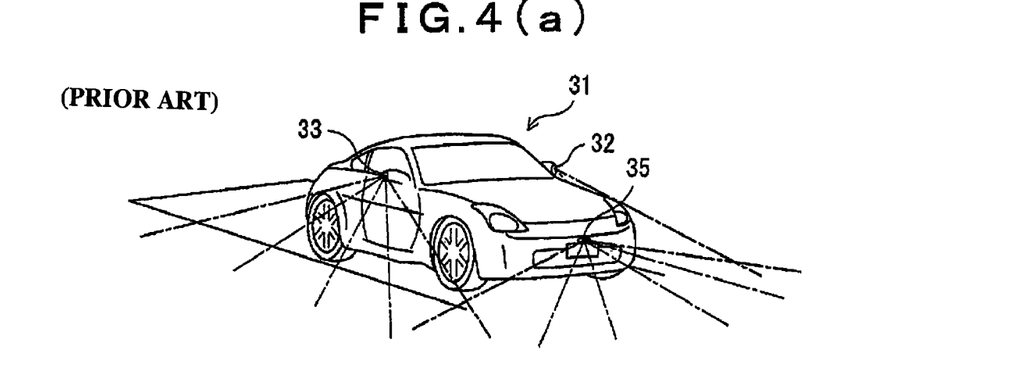
FIG. 4 illustrates an example wherein images photographed by plural cameras form an image viewed as from above a vehicle.
Figure 4B:
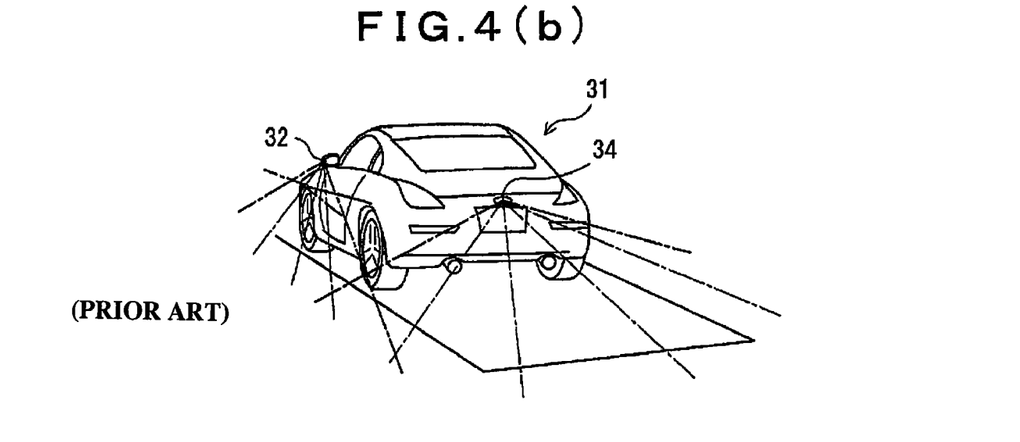
Figure 4C:
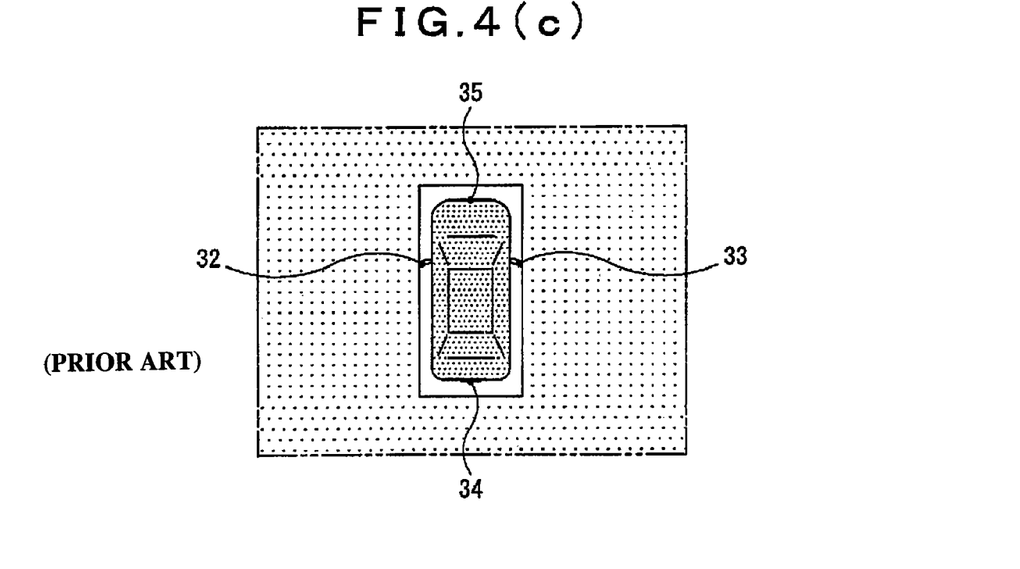

To overcome the above problem, there has been a proposal which mounts plural cameras for photographing the surroundings of a vehicle, synthesizes images photographed by these cameras, forms an image as if one camera positioned above the vehicle photographed the vehicle and its surroundings, and displays a synthesized image on a monitor. In using such plural cameras, a construction using four cameras in total, as shown in FIG. 4, for example, has been proposed which includes a left side camera 32 that photographs from the left side of a vehicle 31, a right side camera 33 that photographs from the right side of the vehicle 31, a back side camera 34 that photographs from the back side of the vehicle 31, and a front side camera 35 that photographs from the front side of the vehicle 31. The images photographed by all the cameras are synthesized, and an image as if one camera positioned right above the vehicle 31 photographed the entire surroundings is displayed on a monitor, as FIG. 4(c) illustrates in outline. This system is called the top view system, and the number of cameras for photographing the surroundings of the vehicle is two or three as required, which is appropriately selected, and the cameras are located at various selected positions.

Japanese Patent Laid-Open No. 2004-56219 discloses a technique that provides a marker display on a screen for an object having a ground clearance in an image taken by the rear camera. Japanese Patent Laid-Open No. 2003-204547 discloses a technique that, when photographing the surroundings of the vehicle by using plural cameras and obtaining a synthesized image, sets the photographing directions of the cameras so that the image of an object located in the photographing peripheral region of the plural cameras does not go out of sight.

Adopting the top view system mentioned above, that uses plural cameras for photographing the surroundings of a vehicle, synthesizes images photographed by the cameras, and displays an image as if one camera positioned above the vehicle photographed the surroundings with the vehicle in the center, will provide a display unit that does not give a distorted image of an object near the vehicle, and makes it possible to easily comprehend a feeling of distance and convey a feeling of easy viewing. However, this system cannot photograph a three-dimensional object higher than a setting position of the cameras, or may photograph such an object to be imaged gigantically, which is disadvantageous in the conventional technique.

Figure 5A:
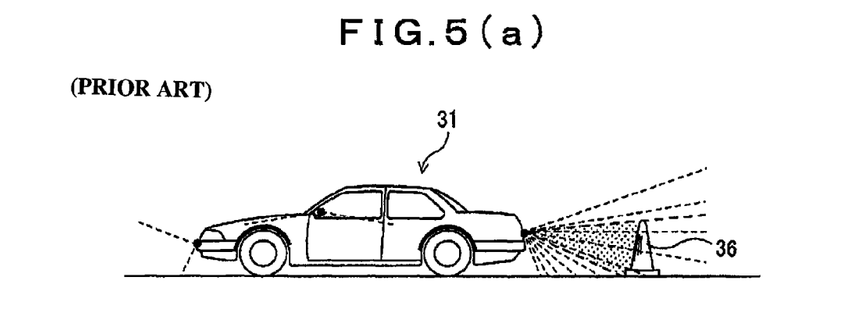
FIG. 5 illustrates an example of a three-dimensional object displayed by a conventional display technique for processing images photographed by plural cameras.
Figure 5B:
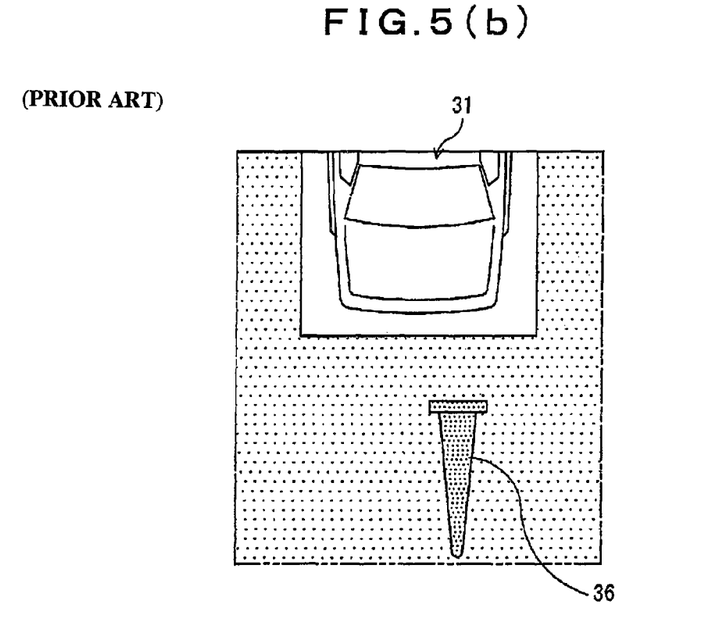

When a driver slowly backs the vehicle 31 into a garage, as shown in FIG. 5, for example, and when there is an object 36 to the rear of the vehicle 31, a processed display image of the object 36 photographed by the rear camera gives a plane, elongated figure, as shown in FIG. 5(b). Therefore, it is difficult to determine whether the displayed object is planar or not from this displayed image. As a result, when driving the vehicle while viewing this image, the driver will feel uneasy and face a danger of colliding with the object.

BRIEF SUMMARY

In view of this problem, the present invention provides a display method of processing images photographed by plural cameras and an apparatus for the same, which synthesizes the images by the plural cameras mounted on a vehicle for photographing the surroundings thereof and makes it possible to display an easily viewable three-dimensional object near the vehicle as if photographed by one camera positioned above the vehicle.

According to one aspect of the invention, a display method of processing images photographed by plural cameras includes: capturing the images photographed by plural cameras for photographing the surroundings of a vehicle, synthesizing the images into an image viewed as from above the vehicle, and displaying the image; detecting a three-dimensional object by detecting an area wherein the displayed image varies from other areas in the synthesized image; and performing an image processing to the detected three-dimensional object in a manner different from the synthesizing processing of the image viewed as from above the vehicle, and displaying an image of the three-dimensional object by an image associated with the image viewed as from above the vehicle.

In the above display method of processing images photographed by plural cameras, the three-dimensional object may be detected by an area of varying intensity in a screen.

In the above display method of processing images photographed by plural cameras, the three-dimensional object may be detected by an area of varying chrominance in the screen.

In the above display method of processing images photographed by plural cameras, a predetermined region may be set in a display screen and the three-dimensional object may be detected by an area of the display image varying in the predetermined region.

In the above display method of processing images photographed by plural cameras, the predetermined region may be set according to a travel direction of the vehicle.

In the above display method of processing images photographed by plural cameras, the predetermined region may be set on the basis of a distance from the vehicle as detected by radar or sonar mounted on the vehicle.

In the above display method of processing images photographed by plural cameras, the three-dimensional object may be detected, after the area wherein the displayed image varies from other areas is detected, by detecting an image variation in the detected area characteristic of the three-dimensional object.

In the above display method of processing images photographed by plural cameras, the image variation characteristic of the three-dimensional object may be detected by a small variation of the image displayed in the detected area.

In the above display method of processing images photographed by plural cameras the image of the three-dimensional object may be displayed in relation to a base of the detected three-dimensional object.

In the above display method of processing images photographed by plural cameras, the displayed image of the three-dimensional object may be a two observation point image.

According to another aspect of the invention, a display apparatus for processing images photographed by plural cameras includes: a means for processing an image viewed as from above a vehicle that captures the images photographed by the plural cameras for photographing the surroundings of the vehicle, synthesizes the images into the image viewed as from above the vehicle, and displays the image; a three-dimensional object detection means that detects a three-dimensional object by detecting an area wherein the displayed image varies from other areas in the synthesized image; a three-dimensional object image processing means that forms an image of the three-dimensional object detected by the three-dimensional object detection means in a manner different from the synthesized image viewed as from above the vehicle; and an image display means that, when the three-dimensional object detection means detects the three-dimensional object, associates the image viewed as from above the vehicle and the image of the three-dimensional object, and displays the associated images.

In the above display apparatus for processing images photographed by plural cameras, the three-dimensional object detection means may detect the three-dimensional object by an area of varying intensity in a screen.

In the above display apparatus for processing images photographed by plural cameras, the three-dimensional object detection means may detect the three-dimensional object by an area of varying chrominance in a screen.

In the above display apparatus for processing images photographed by plural cameras, the three-dimensional object detection means may set a predetermined region in a display screen and detect the three-dimensional object by an area of the display image varying in the predetermined region.

In the above display apparatus for processing images photographed by plural cameras, the predetermined region may be set according to a travel direction of the vehicle.

In the above display apparatus for processing images photographed by plural cameras, the predetermined region may be set on the basis of a distance from the vehicle as detected by radar or sonar mounted on the vehicle.

In the above display apparatus for processing images photographed by plural cameras, after detecting the area wherein the displayed image varies from other areas, the three-dimensional object detection means may detect an image variation characteristic of the three-dimensional object in the detected area.

In the above display apparatus for processing images photographed by plural cameras, the image variation characteristic of the three-dimensional object may be detected by a small variation of the image displayed in the detected area.

In the above display apparatus for processing images photographed by plural cameras, the image of the three-dimensional object may be displayed in relation to a base of the detected three-dimensional object.

In the above display apparatus for processing images photographed by plural cameras, the displayed image of the three-dimensional object may be a two observation point image.

In view of the embodiments described above, it is possible to display an easily viewable three-dimensional object near the vehicle as if one camera were positioned above the vehicle, through synthesizing images by plural cameras mounted on a vehicle for photographing the surroundings thereof. As a result, the user is able to drive the vehicle with a sense of security and avoid a collision with an obstacle.

DETAILED DESCRIPTION OF THE PREFERRED EMBODIMENTS

The present invention displays an easily viewable three-dimensional object near a vehicle as if one camera were positioned above the vehicle, through images by plural cameras mounted on the vehicle that photograph the area outside the vehicle. For this, the invention provides a display method for processing the images photographed by the plural cameras, including: capturing the images photographed by the plural cameras for photographing the surroundings of the vehicle, synthesizing the images into an image viewed as from above the vehicle, and displaying the image; detecting a three-dimensional object by detecting an area wherein the displayed image varies from other areas in the synthesized image; and performing an image processing on the detected three-dimensional object in a manner different from the processing of the image viewed as from above the vehicle, and displaying an image of the three-dimensional object by an image associated with the image viewed as from above the vehicle.

Figure 1:
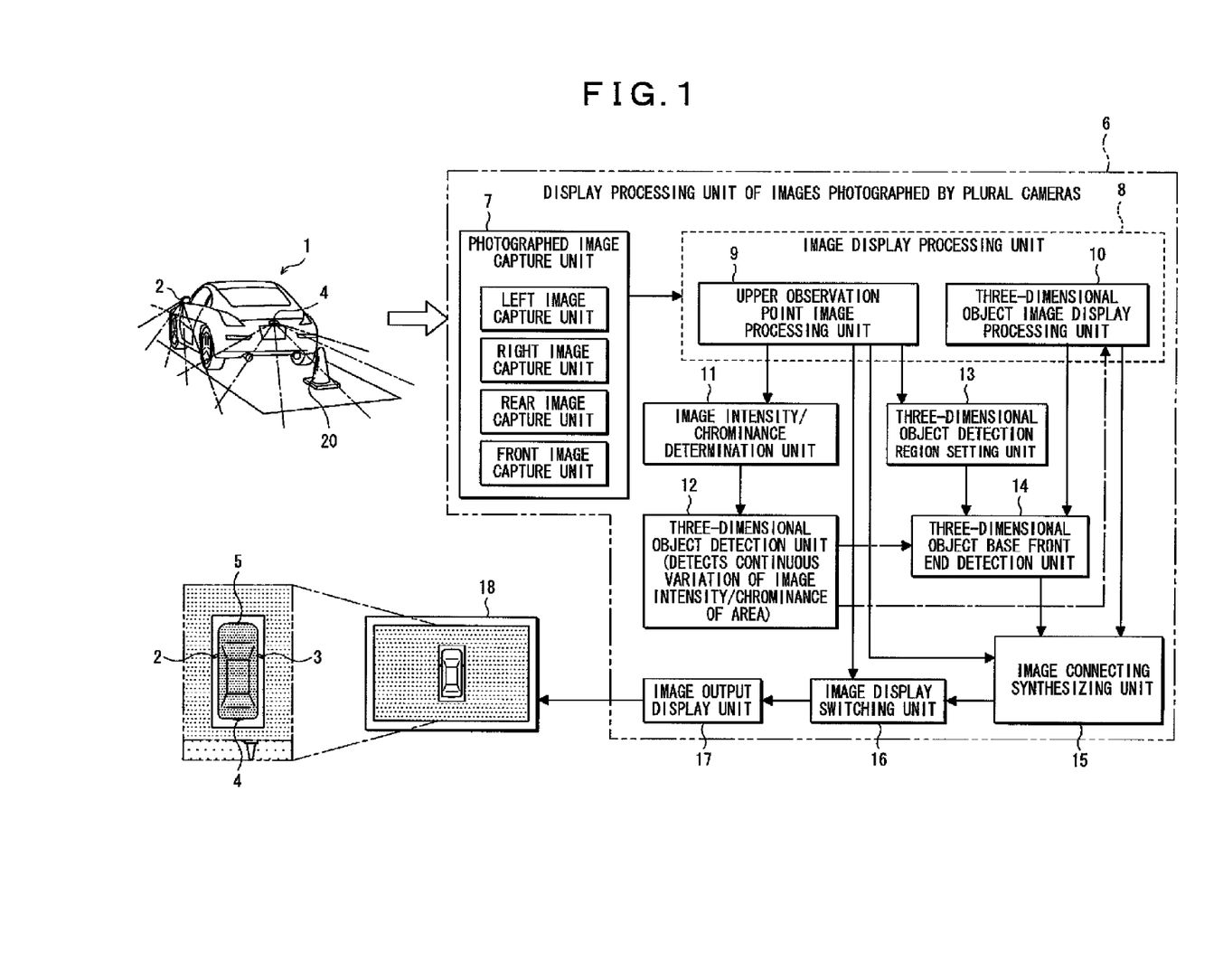
FIG. 1 is a functional block diagram of an embodiment of the present invention.

An embodiment of the present invention will be described with reference to the appended drawings. FIG. 1 is a functional block diagram of one embodiment, which generally illustrates the function of displaying a three-dimensional object located near a vehicle in the image display of the top view system that synthesizes images photographed by plural cameras for photographing the surroundings of the vehicle and displays an image of the area surrounding the vehicle with the vehicle located in the center as if using one camera positioned above the vehicle. In the drawing, the functional unit that performs each function can be referred to as a means that performs the function.

In the example illustrated in FIG. 1, in the same manner as illustrated in FIG. 4, images photographed by cameras 2, 3, 4, 5 that each photograph an area outside of a vehicle 1 are captured by a photographed image capture unit 7 of a display processing unit 6. An image display processing unit 8 performs a predetermined image display processing on the captured images. In the conventional image processing, an upper observation point image processing unit 9 as the top view image processing unit performs image processing relative to an observation point above the vehicle by means of the same method as described for in FIG. 4. The processed image is supplied to an image output display unit 17, and is displayed on a monitor 18.

Figure 3A:
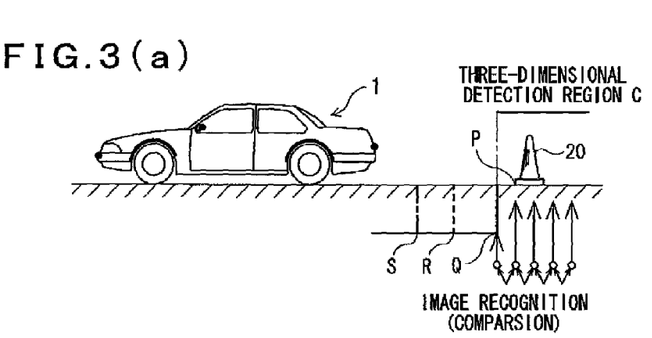
FIG. 3 illustrates the operation of the embodiment.
Figure 3B:
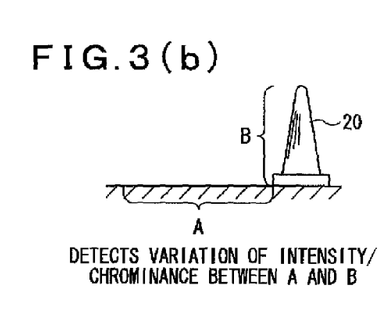
Figure 3C:
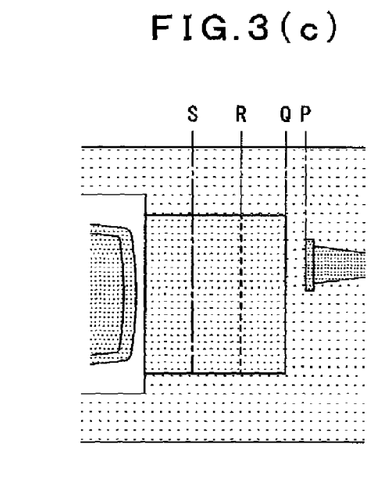

A three-dimensional object detection region setting unit 13 sets, in the upper observation point image, a three-dimensional object detection region C in a specific image display area, for example, a rear area of the vehicle, as shown in FIG. 3(a). An image intensity/chrominance determination unit 11 detects an area of the upper observation point image having the display processing performed as described above by the upper observation point image processing unit 9, wherein an intensity or chrominance difference is equal to or more than a predetermined level, particularly as to the three-dimensional object detection region C set by a three-dimensional object detection region setting unit 13. That is, as shown in FIG. 3(b), in detecting a three-dimensional object 20, the image intensity/chrominance determination unit 11 compares the intensity or the chrominance between a region A on the road in front of the three-dimensional object 20 and the front side B of the three-dimensional object 20. From this comparison, the image intensity/chrominance determination unit 11 determines that a three-dimensional object exists with a high probability if the intensity or the chrominance difference is equal to or more than a predetermined level.

When there is an area in which the intensity or the chrominance difference is equal to or more than the predetermined level in the three-dimensional object detection region C, a three-dimensional object detection unit 12 continuously monitors whether or not the intensity or the chrominance is continuously varying; and when it is continuously varying, the three-dimensional object detection unit 12 determines that a detected area is a three-dimensional object. In this determination, when the three-dimensional object reaches a three-dimensional object detection area Q, the three-dimensional object detection unit 12 finally determines that it is a three-dimensional object. When the three-dimensional object detection unit 12 detects a three-dimensional object, a three-dimensional object base front end detection unit 14 detects a front end of a base as the ground side, namely, an area on the side nearest the vehicle as a base front end, of the image of the three-dimensional object processed by a three-dimensional object image display processing unit 10.

Figure 3D:
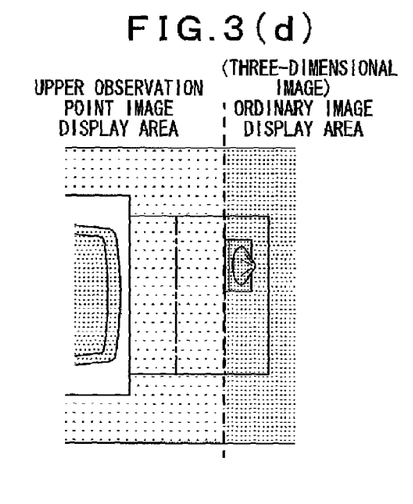
Figure 3E:
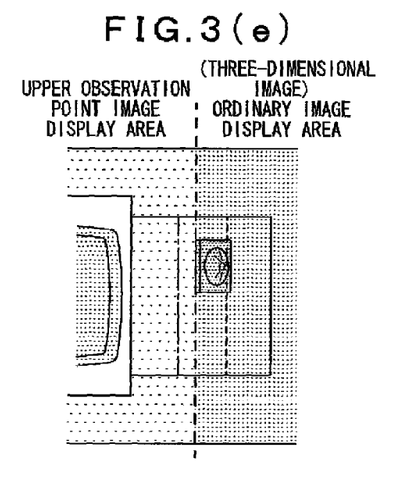

When the three-dimensional object detection unit 12 detects a three-dimensional object as described above, the three-dimensional object image display processing unit 10 in the image display processing unit 8 detects a front end P of a base being the ground area of the three-dimensional object. And when the base front end P reaches a preset position R at which the display of the three-dimensional object starts, the three-dimensional object image display processing unit 10 performs the processing for displaying the three-dimensional object using ordinary camera images, or the processing for displaying the three-dimensional object using two observation point images. An image connecting synthesizing unit 15 associates the upper observation point image by the upper observation point image display processing unit 9 and the three-dimensional object image by the three-dimensional object image display processing unit 10 at the base front end P of the three-dimensional object and synthesizes the images to display an image, as shown in FIG. 3(d), for example. As the vehicle continues to move, it approaches the three-dimensional object 20, and the display of the three-dimensional object 20 changes along with this approach. This change in view of the three-dimensional object also serves to assist the user to correctly understand the state of the three-dimensional object.

When the three-dimensional object detection unit 12 detects the three-dimensional object 20 in the three-dimensional object detection region C, and the base front end P of the object reaches the preset position R at which the display of the three-dimensional object starts, an image display switching unit 16 switches the display of only the upper observation point image by the upper observation point image display processing unit 9, that is, the ordinary display of the top view image, into the display of the image being associated and synthesized by the image connecting synthesizing unit 15. The image output display unit 17 produces the image selected and switched by the image display switching unit 16 for display on the monitor 18. Thereafter, the vehicle continues to approach the three-dimensional object 20, and when the three-dimensional object 20 reaches a predetermined line S, it is possible to deliver to the driver a warning that an obstacle is approaching.

In the described embodiment, the regions such as the three-dimensional object detection region C are set by straight lines, as an example, but they may be set by circular arcs as another example. In the display processing of the three-dimensional object, since displaying an image by a wide-angle lens worsens visibility, it is preferable to correct or remove the distortions of an image before display. In setting the regions, in addition to setting the distance from the vehicle on the screen, it is advisable to measure the distance between the vehicle and the three-dimensional object by a conventionally used radar or sonar and detect that the three-dimensional object exists in a predetermined region. Further, in the above embodiment, an example is described in which the vehicle is moving in reverse; however, the embodiment also can be applied to a case in which the vehicle moves forward. Moreover, in setting a region, it is possible to detect the steering angle of the vehicle and set the region with the travel direction of the vehicle taken into consideration.

Figure 2:
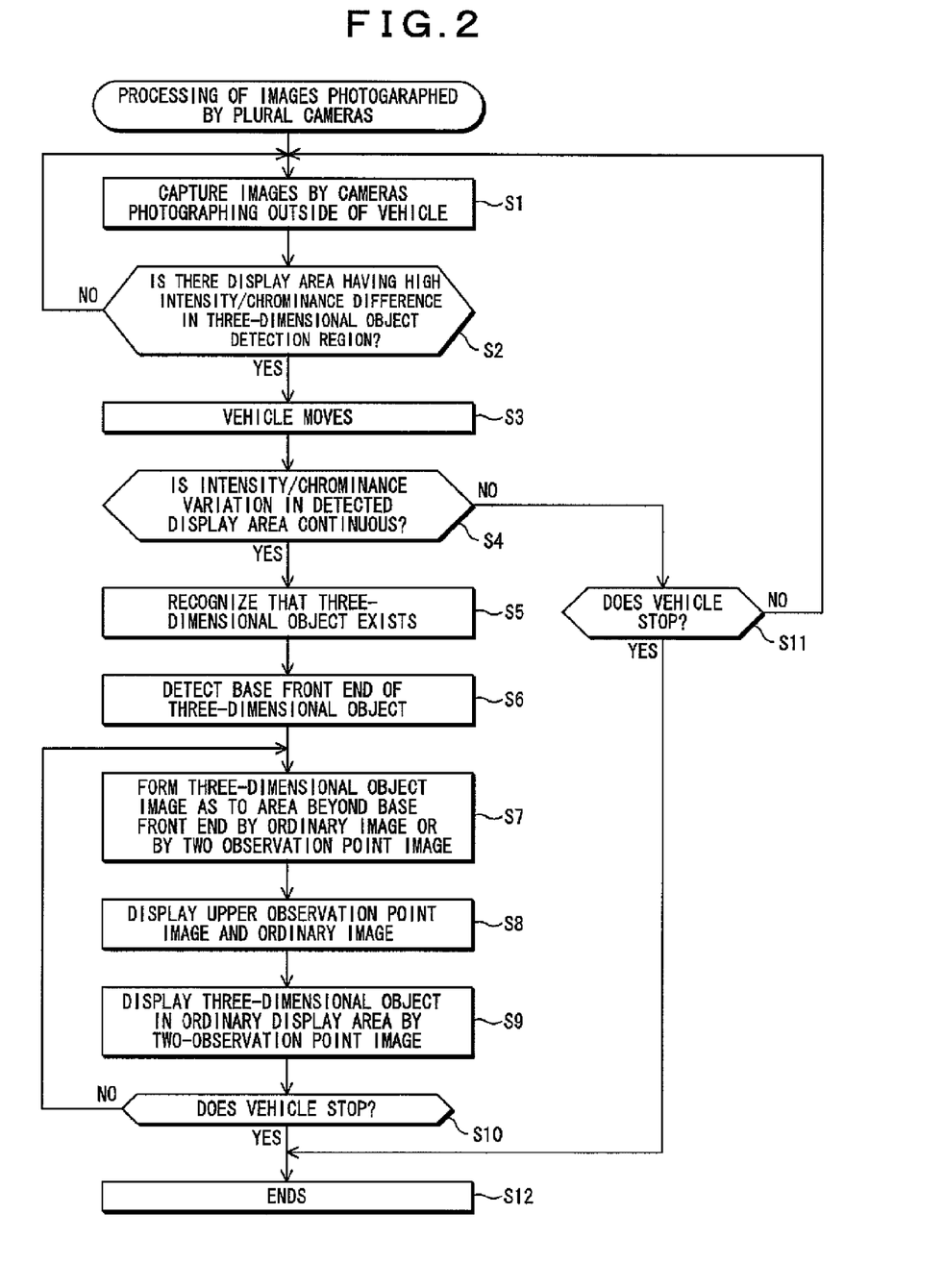
FIG. 2 is an operational flow chart of the embodiment.

The method of displaying images photographed by plural cameras of the embodiment described above can be implemented according to the operational flow as shown in FIG. 2. In the display processing of the images photographed by the plural cameras, the first step S1 captures images by cameras photographing the surroundings of the vehicle. Then, step S2 determines whether or not a display area having a high intensity/chrominance difference exists in the three-dimensional object detection region.

In this processing, when the three-dimensional object detection region setting unit 13 sets a predetermined three-dimensional detection region within the images processed by the upper observation point image processing unit 9, the image intensity/chrominance determination unit 11 illustrated in FIG. 1 detects and determines, on the basis of the images by the plural cameras captured by the photographed image capture unit 7, an area within the three-dimensional object detection region wherein the intensity or the chrominance difference is equal to or more than a predetermined level. When step S2 determines that such a display area does not exist, the process returns to step S1 and repeats the above operation.

When step S2 determines that there exists a display area having a high intensity/chrominance difference in the three-dimensional object detection region, as the vehicle continues to move (step S3), step S4 detects the difference of intensity and/or the degree of chrominance of the display area that may be a three-dimensional object, accompanied with t movement of the vehicle, and determines whether the variation of the intensity/chrominance is continuous or not. This processing is performed by the three-dimensional object detection unit 12 illustrated in FIG. 1, as described above.

When step S4 determines that the variation of the intensity/chrominance of the display area detected previously is continuous, step S5 thereby recognizes that there exists a three-dimensional object in the three-dimensional object detection region. The next step S6 detects the base front end of the three-dimensional object being thus recognized, that is, the area nearest the vehicle of the ground area of the three-dimensional object. This operation is performed by the three-dimensional object base front end detection unit 14 illustrated in FIG. 1.

Thereafter, step S7 displays an ordinary image of the area beyond the base front end of the detected three-dimensional object, or forms a three-dimensional object image by using two observation points. This processing is performed by the three-dimensional object image display processing unit 10 illustrated in FIG. 1. After the three-dimensional object image display processing unit 10 performs this image processing, step S8 connects/synthesizes the upper observation point image and the three-dimensional object display image by the above ordinary image or two observation point image and displays the result. Next, step S10 determines whether the vehicle has stopped or not. When the vehicle has not stopped yet, the process returns to step S7 and continues the image formation/image display processing.

When the variation of the intensity/chrominance of the display area is determined not to be continuous at step S4, step S11 determines whether the vehicle has stopped or not; and when the vehicle has not stopped yet, the process returns to step S1 and repeats the above operation. When the vehicle is determined to have stopped at step S11, step S12 terminates the processing, which is the same as the case the vehicle is determined to be stopped at step S10.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

The invention claimed is:

1. A display method of processing images photographed by a plurality of cameras, comprising:
    capturing images photographed by the plurality of cameras configured to photograph surroundings of a vehicle;
    synthesizing the images using a first processing method, into a synthesized image as viewed from above the vehicle;
    displaying the synthesized image;
    detecting a three-dimensional object on a road surface by detecting an area in which the displayed synthesized image varies from other areas in the synthesized image; and
    performing image processing on the synthesized image using a second processing method to detect the three-dimensional object, the second processing method comparing an intensity or chrominance difference between a region on the road surface and a front side of the three-dimensional object,
    wherein, after the area where the displayed image varies from other areas is detected, the three-dimensional object is detected by detecting an image variation characteristic of the three-dimensional object in the detected area;
    wherein the first processing method is different than the second processing method; and
    displaying an image of the three-dimensional object associated with the synthesized image and the detected three-dimensional object, viewed as from above the vehicle.

2. The display method of claim 1, wherein the three-dimensional object is detected by an area of varying intensity in an image.

3. The display method of claim 1, wherein the three-dimensional object is detected by an area of varying chrominance in an image.

4. The display method of claim 1, wherein a predetermined region is set in a display screen and the three-dimensional object is detected by an area of the display image varying in the predetermined region.

5. The display method of claim 1, wherein the predetermined region is set according to a travel direction of the vehicle.

6. The display method of claim 4, wherein the predetermined region is set on the basis of a distance from the vehicle as detected by radar or sonar mounted on the vehicle.

7. The display method of claim 1, wherein the image variation characteristic of the three-dimensional object is detected by a small variation of the image displayed in the detected area.

8. The display method of claim 1, wherein the image of the three-dimensional object is displayed in relation to a detected base of the three-dimensional object.

9. The display method of claim 1, wherein the displayed image of the three-dimensional object is a two observation point image.

10. A processing apparatus for displaying images photographed by a plurality of cameras, comprising:

means for processing an image viewed as from above a vehicle that captures images photographed by the plurality of cameras, which are configured to:
  photograph surroundings of the vehicle,
  synthesize the images using a first processing method, into an image viewed as from above the vehicle, and display the synthesized image;
three-dimensional object detection means configured to detect a three-dimensional object on a road surface by detecting an area in the synthesized image in which the displayed image varies from other areas;
three-dimensional object image processing means configured to form an image of the three-dimensional object detected by the three-dimensional object detection means by using a second processing method, the second processing method comparing an intensity or chrominance difference between a region on the road surface and a front side of the three-dimensional object, wherein the first processing method being different than the second processing method;
wherein, after the area where the displayed image varies from other areas is detected, the three-dimensional object is detected by detecting an image variation characteristic of the three-dimensional object in the detected area; and
image display means that, when the three-dimensional object detection means detects the three-dimensional object, associates the synthesized image viewed as from above the vehicle and the image of the detected three-dimensional object, and displays a combined image.

11. The processing apparatus of claim 10, wherein the three-dimensional object detection means detects the three-dimensional object by detecting an area of varying intensity in an image.

12. The processing apparatus of claim 10 wherein the three-dimensional object detection means detects the three-dimensional object by detecting an area of varying chrominance in an image.

13. The processing apparatus of claim 10, wherein the three-dimensional object detection means sets a predetermined region in a display screen and detects the three-dimensional object by detecting an area of the display image that varies in the predetermined region.

14. The processing apparatus of claim 13, wherein the predetermined region is set according to a travel direction of the vehicle.

15. The processing apparatus of claim 13, wherein the predetermined region is set on the basis of a distance from the vehicle as detected by radar or sonar mounted on the vehicle.

16. The processing apparatus of claim 10, wherein the image variation characteristic of the three-dimensional object is detected by a small variation of the image displayed in the detected area.

17. The processing apparatus of claim 10, wherein the image of the three-dimensional object is displayed in relation to a detected base of the three-dimensional object.

18. The processing apparatus of claim 10, wherein the image of the three-dimensional object is a two observation point image.

* * * * *